(12) United States Patent
Cavalcanti et al.

(10) Patent No.: US 11,089,444 B2
(45) Date of Patent: Aug. 10, 2021

(54) COOPERATIVE V2X COMMUNICATION

(71) Applicant: Intel Corporation, Santa Clara, CA (US)

(72) Inventors: Dave Cavalcanti, Portland, OR (US); Jeffrey R. Foerster, Portland, OR (US); Vallabhajosyula S. Somayazulu, Portland, OR (US); Nageen Himayat, Fremont, CA (US); Roya Doostnejad, Los Altos, CA (US); Ranganadh Karelia, San Diego, CA (US); Ana Lucia A. Pinheiro, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/473,430

(22) PCT Filed: Mar. 29, 2017

(86) PCT No.: PCT/US2017/024712
§ 371 (c)(1),
(2) Date: Jun. 25, 2019

(87) PCT Pub. No.: WO2018/182590
PCT Pub. Date: Oct. 4, 2018

(65) Prior Publication Data
US 2020/0178043 A1    Jun. 4, 2020

(51) Int. Cl.
*H04W 4/08*    (2009.01)
*H04W 4/024*    (2018.01)
(Continued)

(52) U.S. Cl.
CPC .............. *H04W 4/08* (2013.01); *H04B 7/026* (2013.01); *H04B 7/0617* (2013.01); *H04W 4/024* (2018.02); *H04W 4/40* (2018.02)

(58) Field of Classification Search
None
See application file for complete search history.

(56) References Cited

U.S. PATENT DOCUMENTS

2016/0352394 A1* 12/2016 Boudreau ................ H04J 11/00
2017/0331602 A1* 11/2017 Hugl ..................... H04L 5/0094

FOREIGN PATENT DOCUMENTS

| WO | 2016/209197 A1 | 12/2016 |
| WO | 2017/003405 A1 | 1/2017 |
| WO | 2017011039 A1 | 1/2017 |

OTHER PUBLICATIONS

"5G Automotive Vision." 3GPP Draft; 5G_White Paper Automotive; 3rd Generation Partnership Project (3GPP). 68 pages.
(Continued)

*Primary Examiner* — Christine T Duong
(74) *Attorney, Agent, or Firm* — 2SPL Patent Attorneys PartG mbB; Yong Beom Hwang

(57) ABSTRACT

A method for coordinating communication amongst a plurality of mobile devices, includes generating joint transmission information describing transmission information for use by the plurality of mobile devices in transmitting data related to a cooperative communication message to a destination node and instructing a mobile device to transmit a coordination message to the plurality of mobile devices, wherein the coordination message includes the joint transmission information.

22 Claims, 10 Drawing Sheets

(51) Int. Cl.
*H04W 4/40* (2018.01)
*H04B 7/026* (2017.01)
*H04B 7/06* (2006.01)

(56) References Cited

OTHER PUBLICATIONS

"3rd Generation Partnership Project; Technical Specification Group Services and System Aspects: Study on LTE support for Vehicle to Everything (V2X) services (Release 14)." 3GPP TR 22.885 V14.0.0. (Dec. 2015). 50 pages.
International Search Report dated Dec. 14, 2017 for International Application No. PCT/US2017/024712.
International Preliminary Report on Patentability dated Oct. 1, 2019 for International Application No. PCT/US2017/024712.

\* cited by examiner

COOPERATIVE V2X COMMUNICATION

This application is a National Phase entry application of International Patent Application No. PCT/US2017/024712 filed Mar. 29, 2017, entitled "COOPERATIVE V2X COMMUNICATION" in the name of Dave Cavalcanti et al. and is hereby incorporated by reference in its entirety.

FIELD

The present disclosure relates to the field of wireless communications and in particular to applications including, but not limited to, applications related to the Internet of Things (IoT) and Vehicle to Everything (V2X), Cellular, Multi-Fire, WiFi, WiGig, sensor networks, mesh networks, and so on.

BACKGROUND

IoT and V2X applications typically involve wireless communications between devices without human intervention. Cooperative driving is one example of an IoT application in which vehicles share their intentions with other nearby vehicles, roadway infrastructure, or even pedestrians. Such information is used by automated driving algorithms to enable accurate prediction of what others will do in the near future, and by doing so optimize their own decisions. In synchronized cooperation, autonomous vehicles exchange messages and synchronize their planned trajectories to optimize driving patterns.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
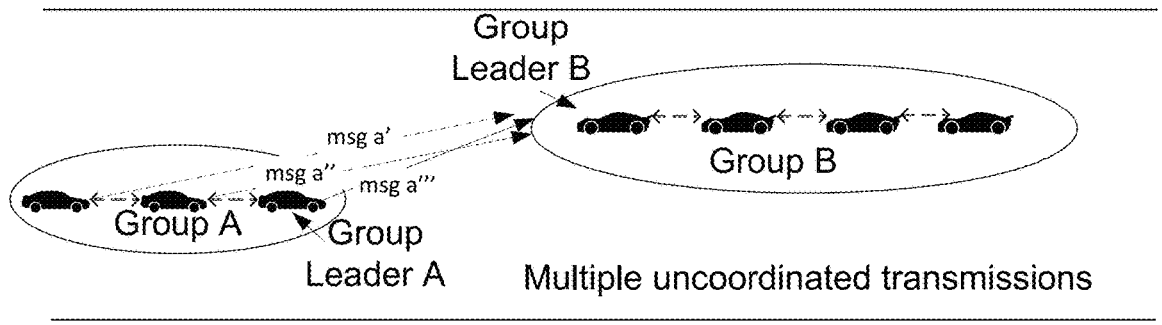
FIG. 1 depicts V2X communication between two groups of vehicles in which the communications from each vehicle in the first group are not coordinated.

During synchronized coordination of driving (e.g., platoon or convoy mode) vehicles form groups with reduced distance among them to improve traffic and fuel efficiency while avoiding collisions. Such higher automation and cooperation levels require data exchange between vehicles with low latency and high reliability. Therefore, efficient and reliable group communication functionality among closely proximate devices is important to enable advanced autonomous driving applications in 5G systems.

Device-to-device communication, which is the "direct" exchange of messages or data between mobile devices without intervention by an eNB, is an attractive option for providing efficient and reliable group communications for many reasons. For example, device-to-device communication can be performed with reduced latency as compared to communication via an eNB. Device-to-device communication can be performed when connection with an eNB is not possible (e.g., in a tunnel or region without cell coverage), increasing reliability.

Direct communication between mobile devices can be supported by device-to-device communication functionality in long term evolution (LTE) proximity services (ProSe). Device-to-device communication is supported over dedicated resource pools, which are preconfigured or allocated by the eNB. Access to data resources within a resource pool (Physical Sidelink Shared Channel (PSSCH)) can be controlled or assigned by the eNB (mode 1) or acquired autonomously by the mobile device (mode 2) using contention within control resources (Physical Sidelink Control Channel (PSCCH)). From the physical layer (PHY) perspective, mobile device data transmissions are broadcast, i.e., all mobile devices within range are potential receivers. Thus, both unicast and one-to-many communications are possible.

In many V2X applications, safety-related messages should be transmitted with very high reliability. Advanced platooning, advanced driving and cooperative collision avoidance (CoCA) are examples of applications that involve the exchange of safety-related messages between vehicles and/or between vehicles and RSUs with extremely high reliability. For the purposes of this description the term basic safety message (BSM) or V2X message will be used as shorthand for any message that is sent by some or all vehicles or mobile devices (e.g., user equipment (UE) devices in some examples) in a group that would benefit from the coordinated transmission techniques that will be described herein. However, other types of messages used by these vehicles or devices may also benefit from coordinated transmission techniques without departing from the spirit and scope of the present disclosure. Further, the term "vehicle" will be used interchangeably with the term "mobile device" as the coordinated communication with be described in the context of cooperative driving. The term mobile device includes any device that is capable of communication with another device and should not be limited to portable devices, thus stationary devices such as those installed in roadside service units (RSUs) or other structures fall within the term mobile device as used herein.

Figure 2:
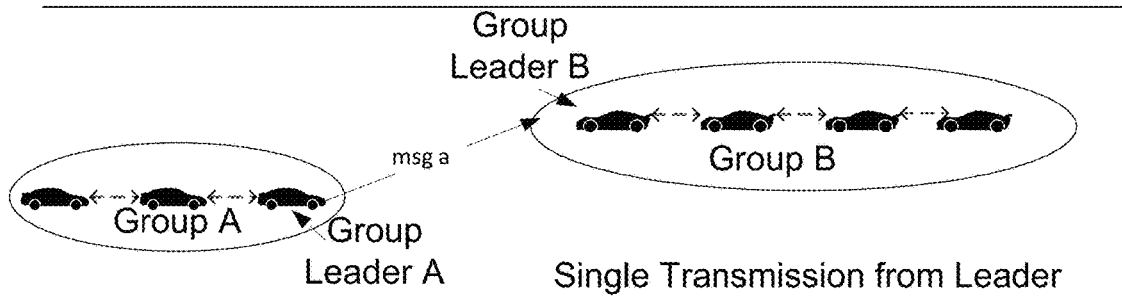
FIG. 2 depicts V2X communication between two groups of vehicles in which a leader of the first group communicates on behalf of all vehicles in the group.

FIGS. 1 and 2 illustrate advanced platooning scenarios where two groups of vehicles, Group A and Group B exchange messages to ensure that each group is aware of the other group's intentions/next actions as they cross each other on the roadway. FIG. 1 illustrates one possible approach in which all vehicles in the group broadcast their own message independently (e.g. each vehicle broadcasts a basic safety message "msg a'", "msg a''", msg a''', respectively, that includes the same group information but the message sent by each vehicle may vary slightly due to the difference in transmitting vehicle). One problem with this approach is the interference and/or communication collisions that may be caused by uncoordinated transmissions. Also, because the multiple uncoordinated transmissions will contend for the same channel, latency/reliability/spectrum efficiency may be degraded.

FIG. 2 illustrates another approach to transmitting a BSM in which a group leader for group A broadcasts the BSM to the other group on behalf of all the vehicles in group A. Although this approach may limit the potential for interference, the single transmission of msg a does not leverage spatial diversity and, depending on the channel conditions between the coordinator and the receiver(s), might not provide the reliability that is appropriate for safety-related messages. In summary, uncoordinated transmissions of critical messages may lead to high contention levels, increased latency and less reliability, especially in congested V2X environments.

Described herein are devices, systems, and methods configured to enable cooperative communication in which multiple vehicles (i.e., mobile devices associated with a vehicle) coordinate their transmission of a message to a destination node. In cooperative and advanced driving applications, such as platooning and cooperative collision avoidance (CoCA), vehicles perform tight coordination and synchronization of their actions (within a group). These capabilities can be exploited to form a "virtual multiple-input-multiple-output" (VMIMO) system that includes the antennas in the different vehicles in the group each acting as an antenna in a virtual antenna array. The coordinated transmission can be used for critical messages, safety-related messages, or any other messages between a group of vehicles and a destination node (e.g., another vehicle, an RSU, an evolved node B (eNB), and so on). As will be established below, coordinated communication enhances the reliability, latency and efficiency of wireless communications. Coordinated communication is well suited to platooning applications in which coordination and tight synchronization is feasible within a limited group of vehicles.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuitry", and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

Figure 3:
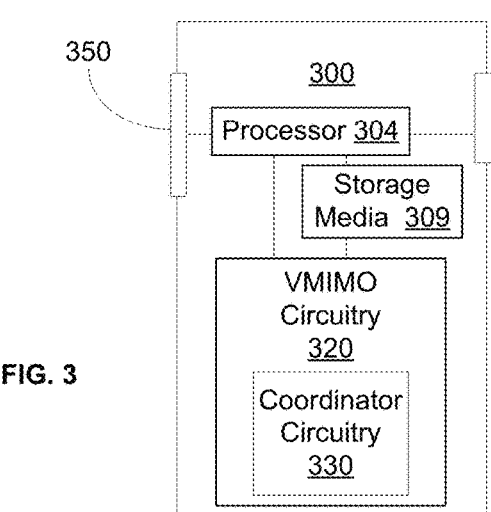
FIG. 3 depicts an exemplary device that is configured to participate in coordinated communication.

FIG. 3 illustrates an exemplary architecture for a mobile device 300 that supports coordinated communication amongst mobile devices. The mobile device 300 includes a processor 304, storage media 309, and a VMIMO circuitry 320 that performs coordinated communication with other mobile devices having VMIMO circuitry. As used herein, the term "circuitry" may refer to, be part of, or include an Application Specific Integrated Circuit (ASIC), an electronic circuit, a processor (shared, dedicated, or group, e.g., processor 304), and/or memory (shared, dedicated, or group, e.g., storage media 309) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The processor 304 may be configured to cooperate with the storage media 309 and/or the VMIMO circuitry 320 to provide higher-layer operations that include generating and processing signals encoding messages transmitted by the mobile device. The processor may be configured to provide a geographical identifier in the various messages transmitted by the mobile device 300 as described herein. The processor may include one or more single-core or multi-core processors. The processor may include any combination of general-purpose processors and dedicated processors including, for example, digital signal processors (DSPs), central processing units (CPUs), microprocessors, memory controllers (integrated or discrete), etc.

The storage media 309 may be used to load and store data or instructions (collectively "logic") for operations performed by the processor 304. The storage media 309 may include any combination of suitable volatile memory and non-volatile memory. The storage media may include any combination of various levels of memory/storage including, but not limited to, read-only memory (ROM) having embedded software instructions (e.g., firmware), random access memory (e.g., dynamic random access memory (DRAM)), cache, buffers, etc. The storage media may be shared among the various processors or dedicated to particular processors. In some embodiments, one or more of the processors may be combined with one or more storage media and, possibly other circuitry in a single chip, a single chipset, or disposed on a same circuit board in some embodiments.

The mobile device 300 is able to communicate with other mobile devices in device-to-device mode (also called Peer-to-Peer (P2P) mode) over a device-to-device interface circuitry 340. Note that the device-to-device interface circuitry 340 may be a dedicated short range communication (DSRC) interface, an enhancement of an existing LTE ProSe PC5 interface, a new ProSe interface defined for 5G systems, a WiFi interface, Bluetooth interface, an interface configured to communicate according to 802.11p, or an interface for any other version of Wireless Personal Area Networks or Wireless Local Area Networks. The mobile device 300 may also include cellular interface circuitry 350 that enables the mobile device to communicate with an eNB or access point/base station. The cellular interface circuitry 350 may be a new fifth generation (5G) interface or it may be an enhancement of existing LTE Uu-interface. The cooperative communication techniques described herein do not require cellular communication and as such in some examples, the mobile device may not include the cellular interface circuitry 350.

The interface circuitry 340 and 350 may be configured to communicate with other network entities over various interfaces using appropriate networking communication protocols. For example, device-to-device communication by way of the device-to-device interface circuitry 340 may be performed in a designated frequency band, such as 5-6 GHz and in accordance with a selected communication protocol suited for such communication. The cellular interface circuitry 350 may be configured to communicate in a different frequency band using a different communication protocol. Either of the interface circuitry 340 or 350 may be capable of communicating using any number of radio access technologies (RATs). In some embodiments, the interface circuitry 340 or 350 may communicate over Ethernet or other computer networking technologies.

Figure 5:
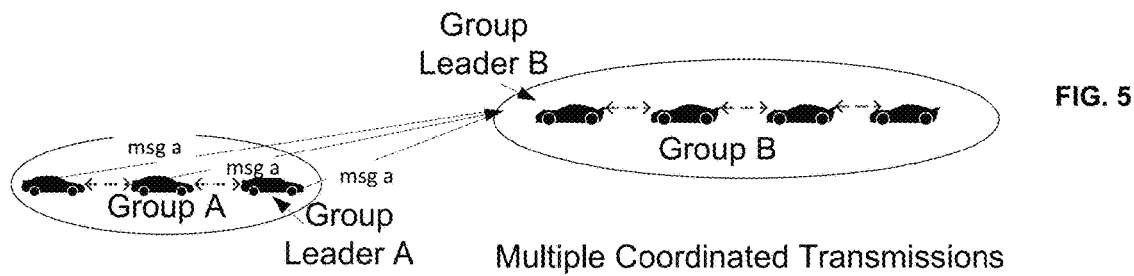
FIG. 5 depicts V2X communication between two groups of vehicles in which the vehicles in the first group perform coordinated communication with a vehicle the second group.

FIG. 5 illustrates coordinated communication in which vehicles within a group operate as a VMIMO system and coordinate their transmission of msg a. During transmission of msg a, the vehicles "share" their antennas (one or more antennas in each vehicle) to create a virtual multiple-antenna transmitter that transmits, in coordination, the same message thus allowing the vehicles to achieve transmit diversity and combat performance degradation effects of fading. This coordinated transmission can be used in a transmit diversity scheme to improve reliability and/or spatial multiplexing to reduce the latency. The coordinated transmission may enable interference alignment inside the group as well. In one sense, a cooperative communication message includes respective data that is sent by a respective each of a plurality of mobile devices to a same destination node such that the destination node interprets the data sent by the plurality of mobile devices as corresponding to a single message from a single source or, in other words, the cooperative communication message includes respective data that is sent by a respective each of a plurality of mobile devices to a same destination node to indicate a single message from a single source.

Figure 6:
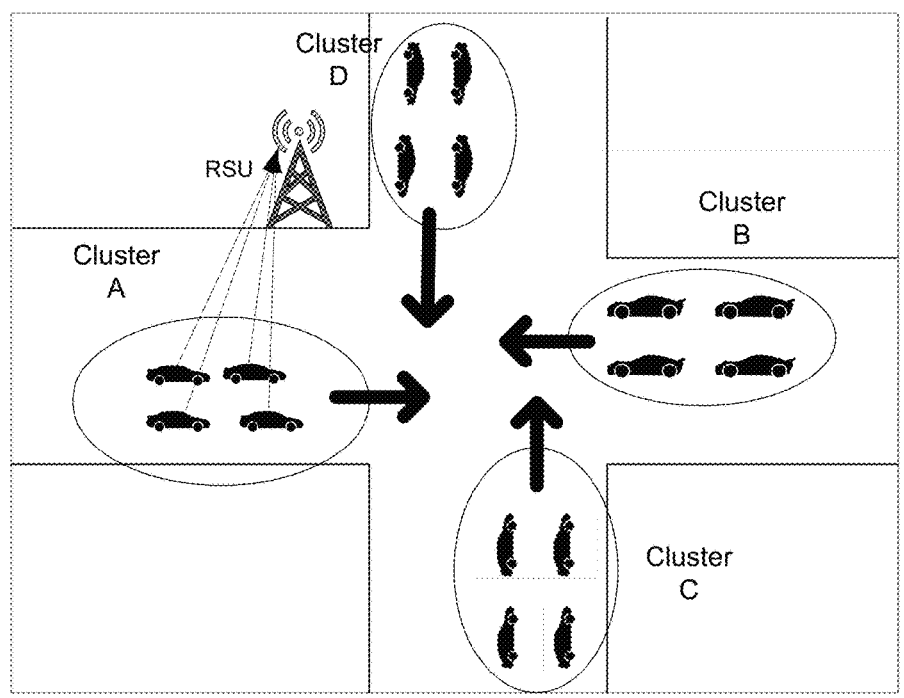
FIG. 6 depicts V2X communication in which the vehicles in a first group perform coordinated communication with a roadside service unit (RSU).

FIG. 6 illustrates coordinated communication between a cluster of vehicles and an RSU. The coordinated communication may be triggered by the group coordinator for specific CoCA messages. The coordinated communication leverages accurate time synchronization and control already supported by the group infrastructure, which can be achieved under the control of a group coordinator node and/or with support from infrastructure nodes in the cellular system (e.g. BS, eNB). The RSU may re-transmit information obtained from the coordinated communication for CoCA purposes. Thus, coordinated communication may be between a group of two or more mobile devices and any "destination node," including: another mobile device, a group of mobile devices, an RSU, an eNB, and so on.

Returning to FIG. 3, the exemplary VMIMO circuitry 320 includes coordinator circuitry 330 configured to enable the mobile device 300 to act as group coordinator and control coordinated communication for a group of mobile devices. Recall that in platooning and other cooperative driving applications, one mobile device in the group is designated as group leader and performs some communications and group maintenance procedures on behalf of all members of the group. In one embodiment, the group coordinator is the same mobile device as this group leader while in other examples the group coordinator may be a different mobile device than the group leader. Note that while the VMIMO circuitry 320 in a mobile device includes coordinator circuitry 330, when the mobile device has not been designated as coordinator of a group, the coordinator circuitry 320, which may include stored instructions that cause the mobile device to perform coordinator-related functions, will not be utilized by the mobile device during that time. In coordinated communication, the group coordinator flags or identifies a message as CCMsg and communicates this designation to the other mobile devices in the group. For example, the group coordinator may determine that all BSMs will be CCMsgs. The group coordinator may transmit the content of the CCMsg to the other mobile devices. In other examples the group coordinator may simply indicate that a particular BSM that is already generated internally by the mobile devices is to be a CCMsg using a specific control signal.

In addition to identifying, for the other mobile devices, the content of the CCMsg, the group coordinator also generates joint transmission information that will be transmitted to the other mobile devices by way of a coordination message or messages. The joint transmission information is used by the mobile devices to coordinate the transmission of the CCMsg. The coordination message may be transmitted to the other mobile devices using device-to-device communication. The joint transmission information includes timing information that communicates, to the other mobile devices, a time at which to transmit the CCMsg to the destination node. The group coordinator may schedule a joint transmission time and communicate the joint transmission time in the coordination message. The group coordinator may schedule individual transmission times for each mobile device and communicate those individual transmission times in the coordination message for the appropriate mobile device. Alternatively, the group coordinator may send out a trigger control frame that causes the mobile devices to transmit the CCMsg in response.

The joint transmission information generated by the group coordinator may include any information that enables the mobile devices in the group to coordinate their transmission of the CCMsg. The joint transmission information may include information identifying a particular resource (e.g., channel, time slot or code) to be used to transmit the CCMsg. The joint transmission information may include information specifying a specific RAT to be used by the mobile devices, so that radio diversity may also be leveraged by coordinated communication. The joint transmission information may include one or more transmitter parameters or settings that should be used by the mobile device in transmitting the CCMsg. The joint transmission information may include beamforming weights as will be described in more detail with reference to FIG. 13. In some examples the coordination information, including the joint transmission information, is sent to the mobile devices prior to the identification of a particular CCMsg by the group coordinator, as will be discussed in more detail with reference to FIG. 14.

Another coordinated communication task that may be performed by the mobile device 300 as controlled by the coordinator circuitry 330 is group time synchronization. In order to enable the coordinated communication, the mobile devices should maintain very accurate time synchronization within the group. Distributed time synchronization protocols (e.g. IEEE 1588) can be adapted to operate over the wireless links connecting the group. The group coordinator can serve as master time reference source. This option may be used with 802.11p/DSRC wireless connectivity for inter-group communication. In case cellular-based Device-to-Device (D2D connectivity is used, time synchronization may also be achieved through the network infrastructure (e.g. eNB).

Figure 4:
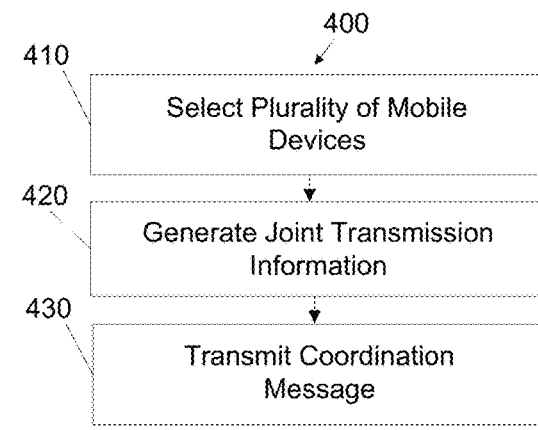
FIG. 4 depicts an exemplary method of performing coordinated communication.

FIG. 4 illustrates an exemplary method 400 that is performed by the coordinator circuitry 330 of FIG. 3. At 410, the method includes selecting a plurality of mobile devices as belonging to a group with the mobile device. At 420 joint transmission information describing transmission information for use by the plurality of mobile devices in transmitting data related to a cooperative communication message is generated. At 430, the method includes instructing the mobile device to transmit a coordination message to the plurality of mobile devices that includes the joint transmission information.

Figure 7:
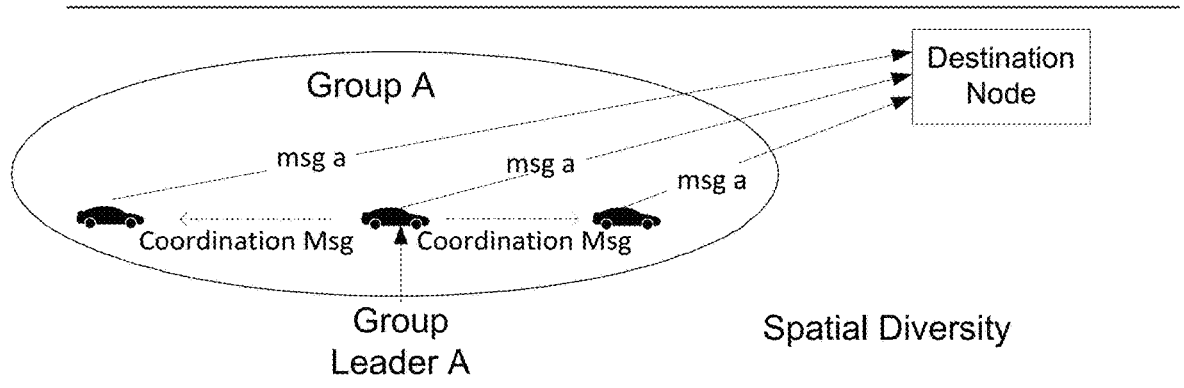
FIG. 7 depicts exemplary coordinated communication that accomplishes spatial diversity.
Figure 8:
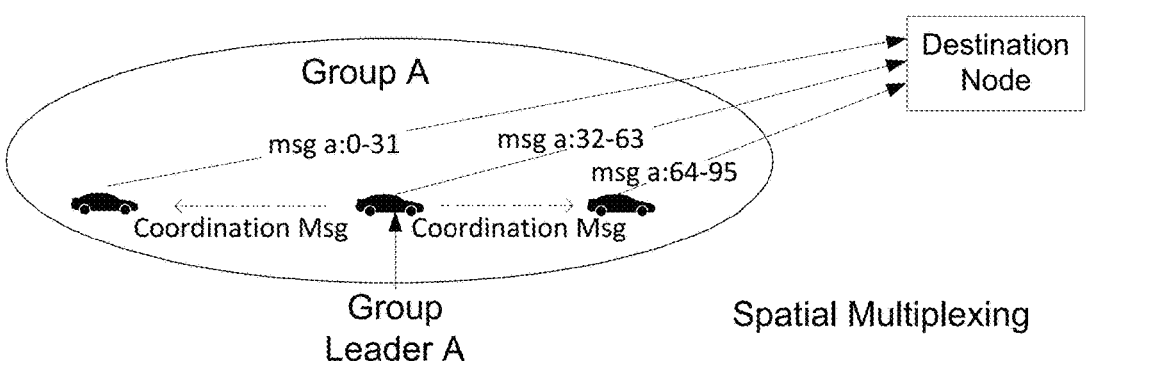
FIG. 8 depicts exemplary coordinated communication that accomplishes spatial multiplexing.
Figure 9:
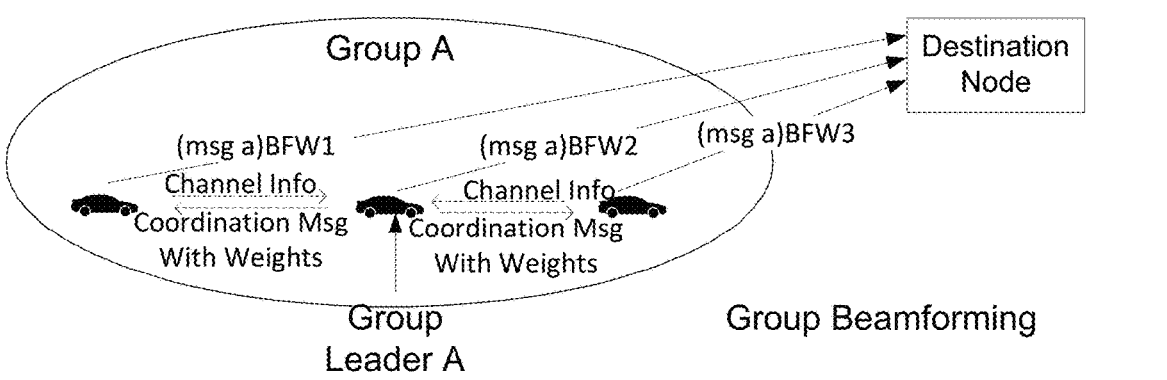
FIG. 9 depicts exemplary coordinated communication that accomplishes group beamforming.

FIGS. 7-9 illustrate three possible types of coordinated communication. In FIG. 7 illustrates how coordinated communication may provide spatial diversity to a transmission of msg a. The group coordinator (in this example Group Leader A) sends coordination messages to the other group members that identifies the content of msg a and also a time and channel on which to transmit msg a. At the time (or trigger event) designated by the coordination message, each member of group A transmits data encoding an identical msg a, providing spatial diversity. FIG. 8 illustrates how coordinated communication may provide spatial multiplexing to transmission of msg a. The group coordinator assigns a portion of msg a to each member of the group. The portion of msg a may be a subset of data encoding msg a, so that when the CCMsgs transmitted by the members of the group reach the destination node, the entirety of the message data is received. In FIG. 8, the 32 bits of a total of 96 bits encoding msg a are assigned to each mobile device in the group by the coordination messages. At the time (or trigger event) designated by the coordination message, each member of group A transmits data encoding its portion of msg a, providing spatial multiplexing. In other examples unequal numbers of bits and out-of-sequence bits may be included in the different portions of the message transmitted by the mobile devices. In some examples, the different portions of the message transmitted by the mobile devices may not include an entirety of the message when combined.

FIG. 9 illustrates how coordinated communication may provide group beamforming (BF) for transmission of msg a. For beamforming, the mobile devices use coordinated multi-point (CoMP) like techniques to align their transmissions and perform joint beamforming with the destination node as shown in FIG. 9. To perform joint BF, the mobile devices weight their transmission of msg a with beamforming weights (BFW) that are based on channel knowledge (e.g. to the destination node). The group coordinator may request that the mobile devices in the group sound the channel for generating BF weights and provide the channel information to the group coordinator. In one example, the group coordinator accesses stored information about the channel between each mobile device and destination node. The group coordinator uses the channel information to determine BF weights for each of the mobile devices (possibly for each mobile device antenna if a vehicle has more than one antenna).

Use Cases

FIGS. 10-14 illustrate flows of messages associated with various use cases for coordinated communication. In these figures, coordinator circuitry and VMIMO circuitry are illustrated as part of the mobile devices in group A. The VMIMO circuitry generates instructions that cause the mobile device to process, generate, and transmit CCMsgs in coordination with the other mobile devices in group A. The coordinator circuitry generates instructions that cause the designated coordinator mobile device to process, generate, and transmit coordination messages and other control signals to the other mobile devices to control the transmission of the CCMsg. The destination node is any device that is the intended recipient of the CCMsg.

When a message is described as being sent between mobile devices in a group, it is to be understood that the message is encoded in data that is sent and received by way of the device-to-device interface circuitry (or in some instances the cellular interface) in the mobile devices. The message may be sent to all mobile devices in the group or to the mobile device that has been assigned as group coordinator, which may then communicate relevant information from the message to other mobile devices in the group. When a message is described as being sent from the mobile device to the destination node, it is to be understood that the mobile device transmits data encoding the message in a manner specified by the joint transmission information from any of its interfaces to the destination node.

Figure 10:
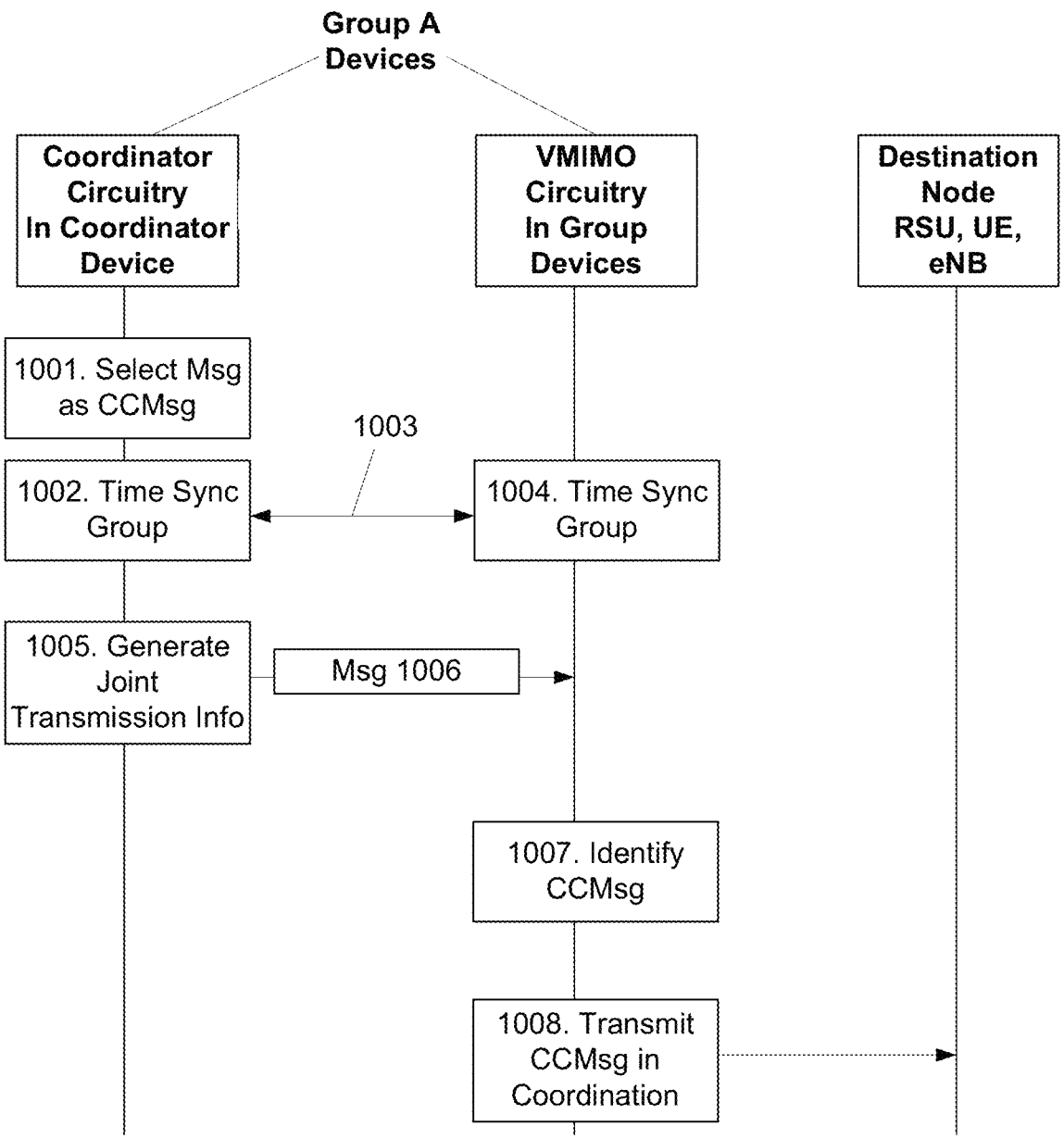
FIG. 10 depicts a first exemplary flow of messages between mobile devices in a group and a destination node during coordinated communication.

FIG. 10 illustrates a flow of messages between a group of mobile devices performing coordinated communication with a destination node. At 3001, the group coordinator mobile device selects a message for coordinated communication. The message may be selected due to its importance, being safety-related, due to temporarily poor communication conditions that necessitate a more reliable way of transmitting, and so on. At 3002-1004, the group coordinator performs time synchronization with the mobile devices in the group. While the time synchronization is illustrated as being performed in every instance of coordinated communication, in some examples, it may be understood that the timing synchronization is performed once or periodically by some unrelated group function and as such synchronization may not need to be performed as part of a coordinated communication. Thus, the synchronization that is normally continuously maintained between group members as part of a background group process that may be leveraged to enable coordinated communication. At 3005 the group coordinator generates joint transmission information that communicates a transmission time at which the other mobile device shall transmit the cooperative communication message. The group coordinator transmits a coordination message msg 3006 to the other mobile devices that identifies the CCMsg and includes the joint transmission information (JTI). The coordination message msg 3006 may identify the CCMsg by including the data encoding the CCMsg or identifying a CCMsg that is internally generated by the mobile device as the CCMsg. At 3007, the mobile devices in the group identify the CCMsg and at 3008, the mobile devices in the group transmit the CCMsg to the destination node in coordination as specified in the joint transmission information (e.g., coordinated in time and/or channel, and so on) with one another.

Figure 11:
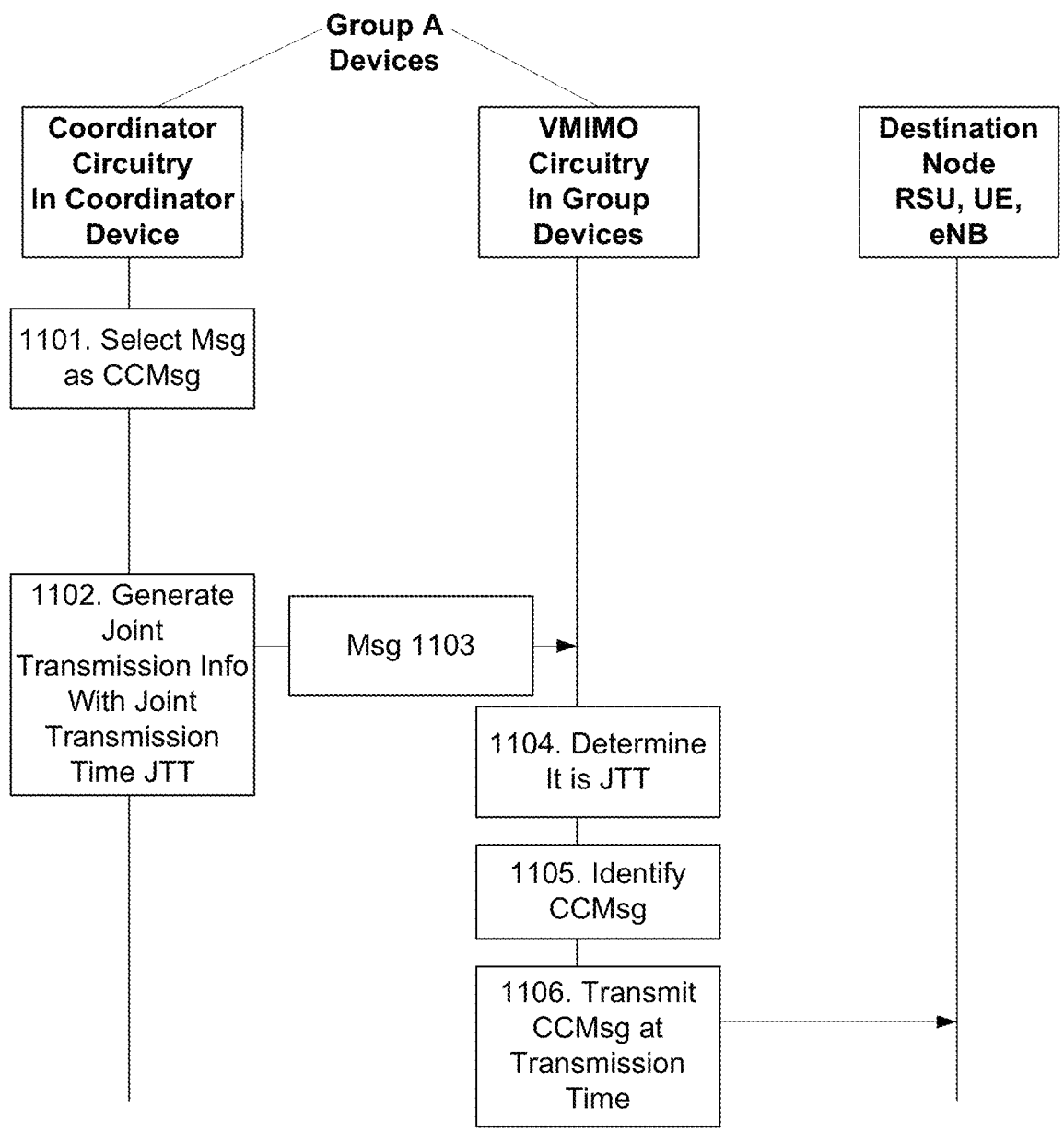
FIG. 11 depicts a second exemplary flow of messages between mobile devices in a group and a destination node during coordinated communication.

FIG. 11 illustrates an exemplary flow of messages during coordinated communication in which the coordination message includes a scheduled transmission time. At 1101, the group coordinator mobile device selects a message for coordinated communication. At 1102 the group coordinator determines timing information, such as, for example, a transmission time and generates joint transmission information that specifies timing information. The group coordinator transmits a coordination message msg 1103 to the other mobile devices that identifies the CCMsg msg 1103 and includes the joint transmission time (JTT). At 1104, the mobile devices determine that it is the joint transmission time. At 1105, in response to determining that it is the joint transmission time the mobile devices in the group identify the CCMsg and at 1106, the mobile devices in the group transmit the CCMsg to the destination node in coordination as specified in the joint transmission information (e.g., coordinated in time and/or channel, and so on) with one another.

Figure 12:
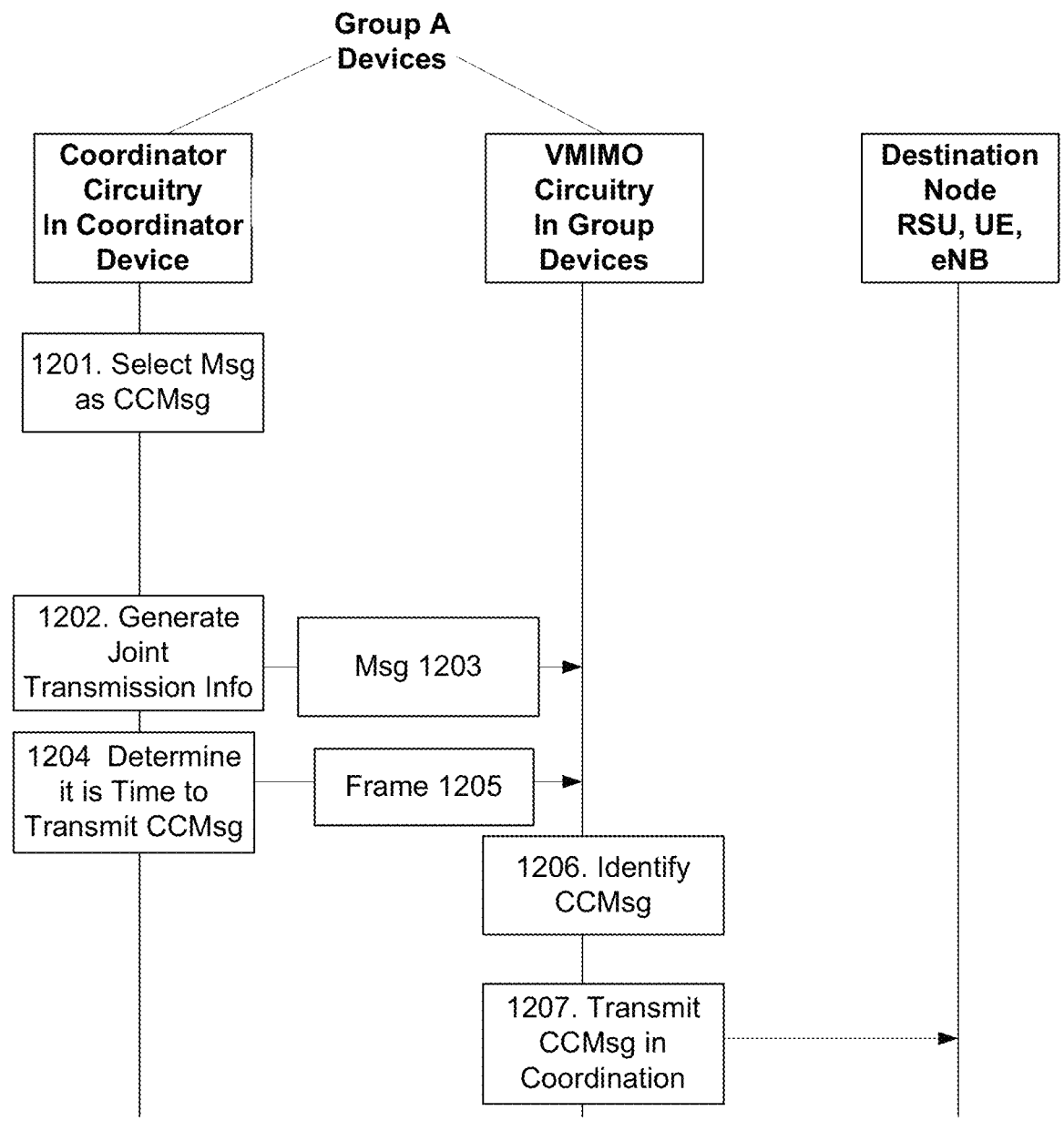
FIG. 12 depicts a third exemplary flow of messages between mobile devices in a group and a destination node during coordinated communication.

FIG. 12 illustrates an exemplary flow of messages during coordinated communication in which transmission of the CCMsg is triggered by a control frame sent by the group coordinator. At 3201, the group coordinator mobile device selects a message for coordinated communication. At 3202 the group coordinator determines a transmission time and generates joint transmission information that specifies that transmission of the CCMsg will be triggered by a control frame. The group coordinator transmits a coordination message msg 3203 to the other mobile devices that identifies the CCMsg and includes the joint transmission information (JTIO). At 3204, the group coordinator determines that it is the transmission time and at 3205 sends a trigger control frame 3205 to the mobile devices in the group. At 3206, in response to the trigger frame, the mobile devices in the group identify the CCMsg and at 3207, the mobile devices in the group transmit the CCMsg to the destination node in coordination as specified in the joint transmission information (e.g., coordinated in time and/or channel, and so on) with one another.

Figure 13:
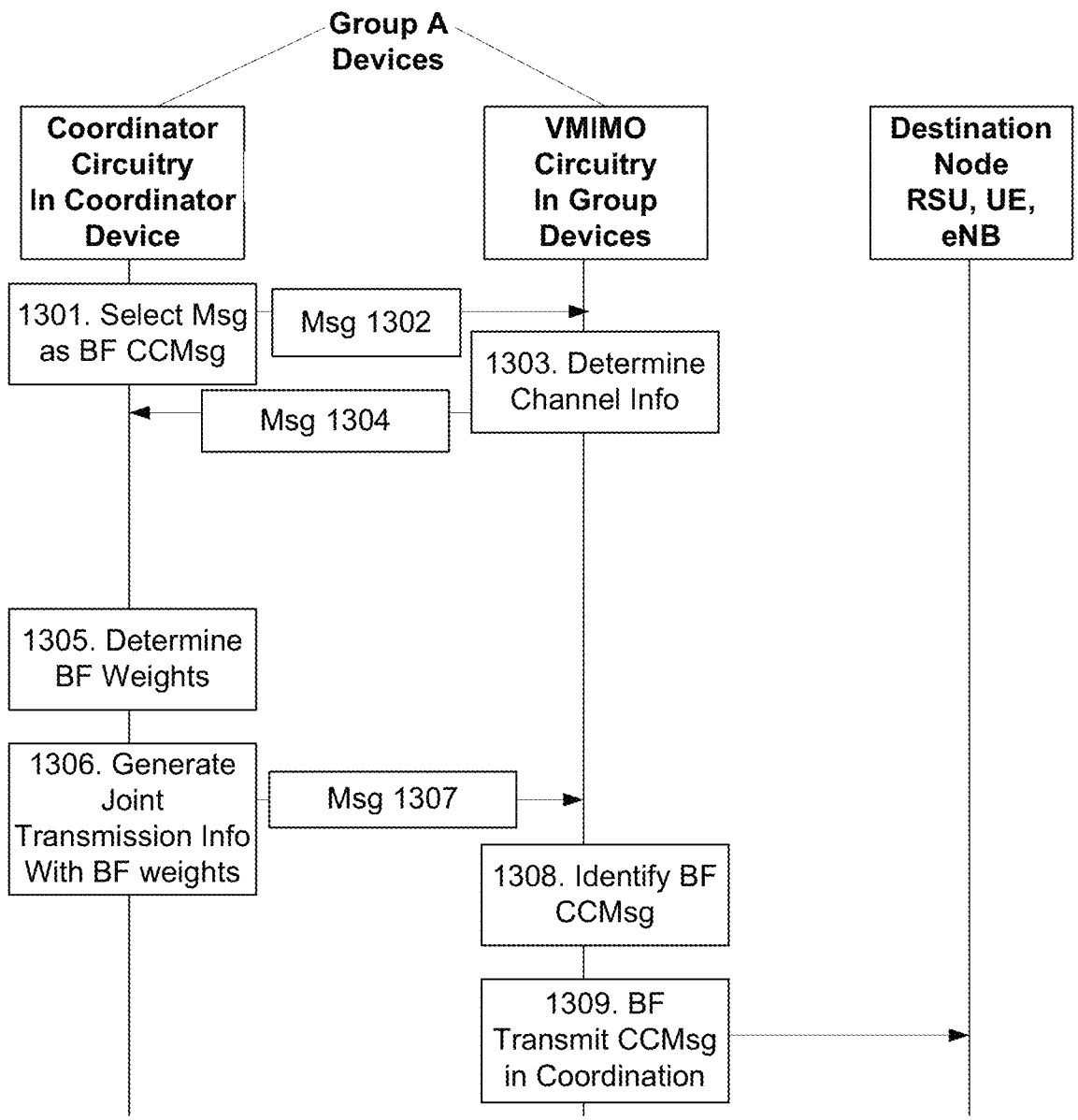
FIG. 13 depicts a fourth exemplary flow of messages between mobile devices in a group and a destination node during coordinated communication.

FIG. 13 illustrates an exemplary flow of messages during coordinated communication in which transmission of the CCMsg is beamformed. At 3301, the group coordinator mobile device selects a message for beamformed BF coordinated communication. By way of msg 3302, the group coordinator requests channel information from each mobile device in the group that describes the channel between the respective mobile device and the destination node. The mobile devices in the group send a message msg 3304 to the group coordinator communicating the channel information. At 3305, the group coordinator determines BF weights to be used by each mobile device antenna. At 3306 the group coordinator determines a transmission time and generates joint transmission information that specifies the time at which to transmit the BF CCMsg and includes the BF weights for each mobile device. The group coordinator transmits a coordination message msg 3307 to the other mobile devices that identifies the CCMsg and includes the joint transmission information (JTI). At 3308 the mobile devices in the group identify the CCMsg. At 3309, the mobile devices in the group transmit the CCMsg, as weighted by the BF weights in the coordination message, to the destination node in coordination as specified in the joint transmission information (e.g., coordinated in time and/or channel, and so on) with one another.

Figure 14:
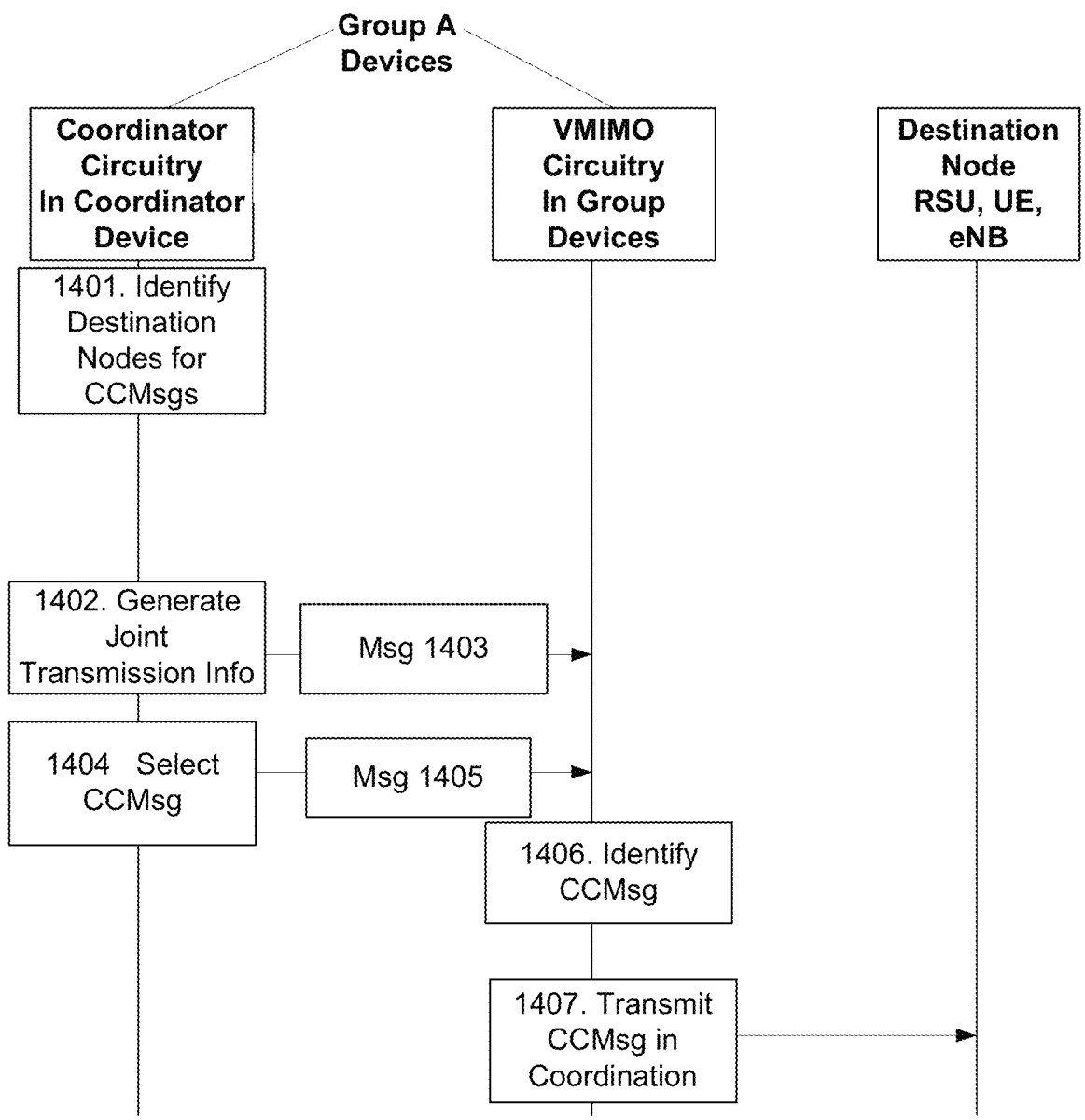
FIG. 14 depicts a fifth exemplary flow of messages between mobile devices in a group and a destination node during coordinated communication.

FIG. 14 illustrates an exemplary flow of messages during coordinated communication in which the coordination message includes joint transmission information that will be used to coordinate communication of CCMsgs that will be identified in the future by the group coordinator. For example, the group coordinator may identify one or more destination nodes that the group should communicate with (e.g., neighboring groups, RSUs, pedestrians, and so on). The group coordinator determines joint transmission information that describes how communication with these destination nodes is to be coordinated. The coordination message sent by the group coordinator includes the joint transmission information, but may not identify any specific CCMsg(s). The joint transmission information may specify a valid period during which the communication is to be coordinated in the manner described by the joint transmission information (e.g., during the time at which the group will be going through an intersection, passing another group, and so on). In this approach the mobile devices can "prepare" for coordinated transmission ahead of time. When the group coordinator selects a CCMsg, a follow up message or trigger frame can be used to identify the CCMsg without having to include the joint transmission information.

At 3401, the group coordinator mobile device identifies a destination node with which coordinated communication is to take place. At 3402 the group coordinator determines timing information, such as, for example, a transmission time and generates joint transmission information that will be used by the mobile devices to control the future coordinated communication of CCMsgs. The group coordinator transmits a coordination message msg 3403 to the other mobile devices that includes the joint transmission information (which may include timing information or possibly other optional information such as resources and transmitter parameters as already discussed). The group coordinator sends a message msg 3405 that identifies the CCMsg(s) to be communicated using the joint transmission information in the coordination message. At 3406, in response to the subsequent message, the mobile devices in the group identify the CCMsg and at 3407, the mobile devices in the group transmit the CCMsg to the destination node in coordination as specified in the joint transmission information and/or the second message (e.g., coordinated in time and/or channel, and so on) with one another.

Figure 15:
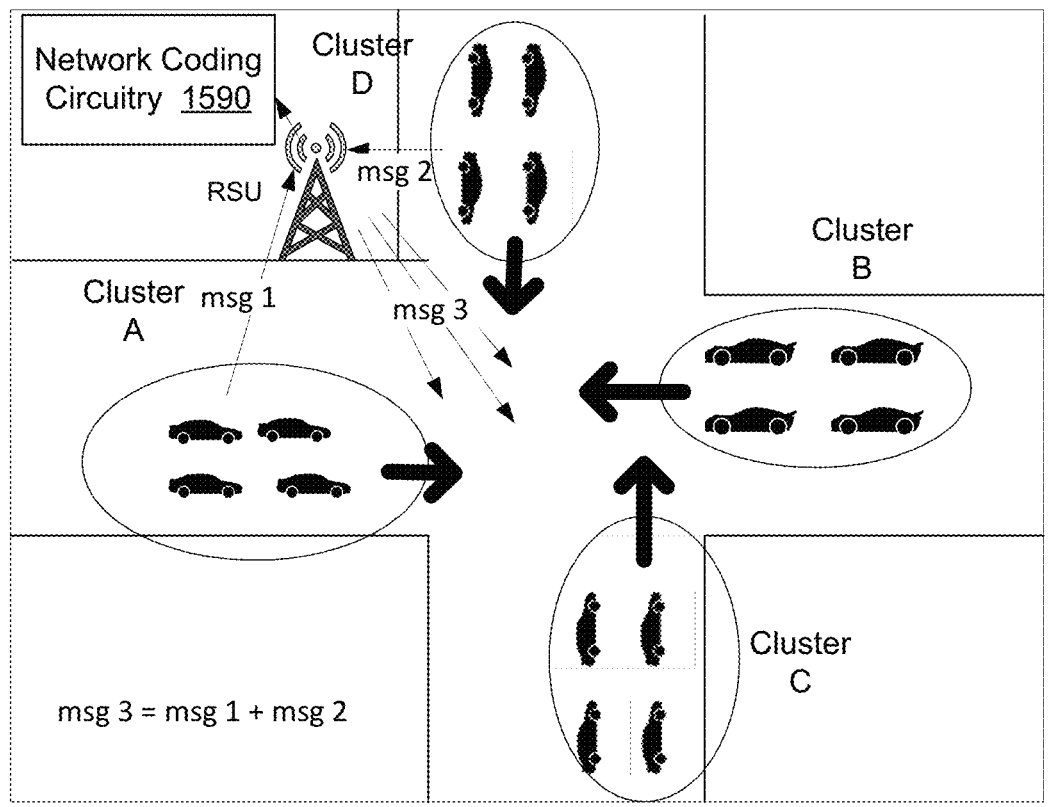
FIG. 15 depicts exemplary V2X communication in which an RSU performs network coding.

FIG. 15 illustrates an exemplary communication scheme that provides network coding based transmissions. In network coding based transmissions, RSUs and/or mobile devices include network coding circuitry 1590 configured to cause the device to combine messages from multiple sources using network coding techniques to enhance the overall system efficiency. For instance, as shown in FIG. 15 two groups of vehicles (UEs) each send messages (msg 1 and msg 2, respectively) that may be useful to RSUs and other vehicles/groups. The RSU can perform network coding and transmit/broadcast the sum of the messages (i.e., msg 3) to all mobile devices/groups. The RSU, after receiving both messages, combines msg 1 and msg 2 and broadcasts the resulting msg 3 to both groups. Network coding circuitry 890 in the mobile devices in both groups is configured to decode the message of the other group. Network coding circuitry in group A will perform (msg 1+msg 2)−msg 1=msg 2 and network coding circuitry in group B will perform (msg 1+msg 2)−msg 2=msg 1. Then both groups have msg 1 and msg 2. This mechanism can improve efficiency.

Figure 16:
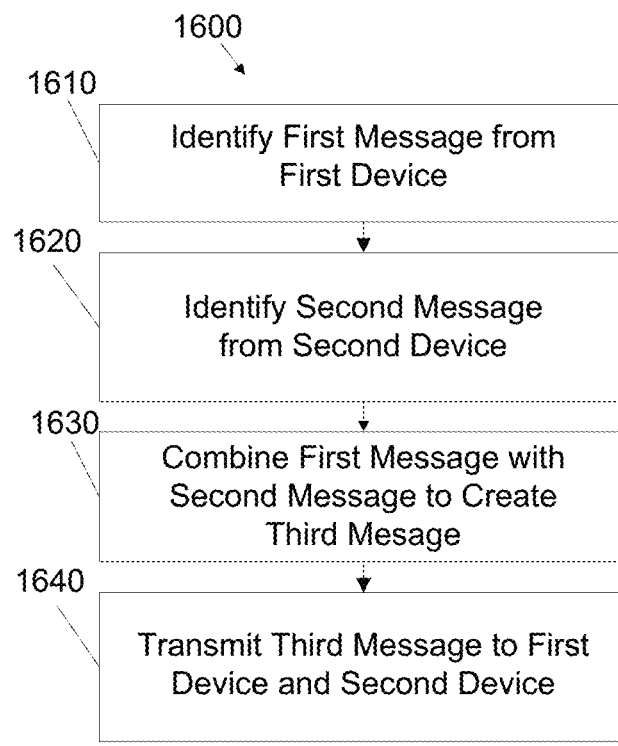
FIG. 16 depicts an exemplary method of performing network coding of V2X communications.

FIG. 16 illustrates an exemplary method 1600 for performing network coded transmissions. The method may be performed by any mobile device or eNB. The method includes, at 1610 identifying a first message received from a first mobile device. At 1620, a second message received from a second mobile device is identified. At 1630, the method includes combining the first message and the second message, based at least on network coding information, to generate a third message. The third message is transmitted to the first mobile device and the second mobile device at 1640.

It can be seen from the foregoing description that the cooperative communication described herein increases reliability and efficiency/performance over single transmission and uncoordinated transmissions in congested environments. Cooperative communication may also help reduce interference between multiple transmissions from multiple vehicles.

Example Device

Figure 17:
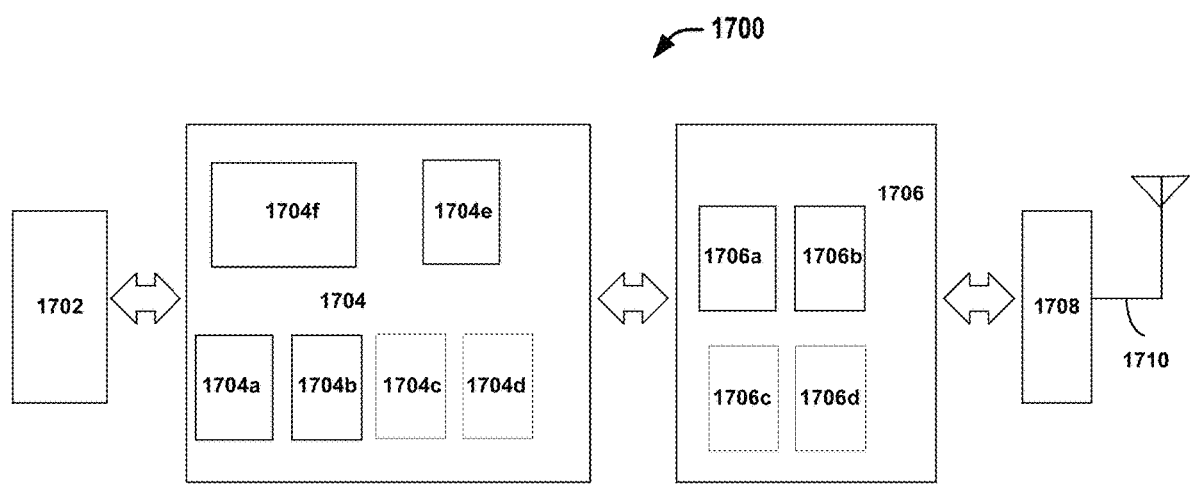
FIG. 17 illustrates example components of a device, according to one embodiment of the disclosure.

Embodiments described herein may be implemented into a system using any suitably configured hardware and/or software. FIG. 17 illustrates, for one embodiment, example components of a device 1700. The device 1700 may be utilized as a User Equipment (UE) device or an evolved node B (eNB) device or E-UTRAN equipment. In some embodiments, the device 1700 may include application circuitry 1702, baseband circuitry 1704, Radio Frequency (RF) circuitry 1706, front-end module (FEM) circuitry 1708 and one or more antennas 1710, coupled together at least as shown.

The application circuitry 1702 may include one or more application processors. For example, the application circuitry 1702 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications, such as a VMIMO application as described and/or operating systems to run on the system.

The baseband circuitry 1704 may include circuitry such as, but not limited to, one or more single-core or multi-core processors. The baseband circuitry 1704 may include one or more baseband processors and/or control logic to process baseband signals received from a receive signal path of the RF circuitry 1706 and to generate baseband signals for a transmit signal path of the RF circuitry 1706. Baseband processing circuitry 1704 may interface with the application circuitry 1702 for generation and processing of the baseband signals and for controlling operations of the RF circuitry 1706. For example, in some embodiments, the baseband circuitry 1704 may include a second generation (2G) baseband processor 1704a, third generation (3G) baseband processor 1704b, fourth generation (4G) baseband processor 1704c, and/or other baseband processor(s) 1704d for other existing generations, generations in development or to be developed in the future (e.g., fifth generation (5G), 6G, etc.). The baseband circuitry 1704 (e.g., one or more of baseband processors 1704a-d) may handle various radio control functions that enable communication with one or more radio networks via the RF circuitry 1706. The radio control functions may include, but are not limited to, signal modulation/demodulation, encoding/decoding, radio frequency shifting, etc. In some embodiments, modulation/demodulation circuitry of the baseband circuitry 1704 may include Fast-Fourier Transform (FFT), precoding, and/or constellation mapping/demapping functionality. In some embodiments, encoding/decoding circuitry of the baseband circuitry 1704 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1704 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1704e of the baseband circuitry 1704 may be configured to run elements of the protocol stack for signaling of the PHY, MAC, RLC, PDCP and/or RRC layers. In some embodiments, the baseband circuitry may include one or more audio digital signal processor(s) (DSP) 1704f. The audio DSP(s) 1704f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1704 and the application circuitry 1702 may be implemented together such as, for example, on a system on a chip (SOC).

In some embodiments, the baseband circuitry 1704 may provide for communication compatible with one or more radio technologies. For example, in some embodiments, the baseband circuitry 1704 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 1704 is configured to support radio communications of more than one wireless protocol may be referred to as multi-mode baseband circuitry.

RF circuitry 1706 may enable communication with wireless networks using modulated electromagnetic radiation through a non-solid medium. In various embodiments, the RF circuitry 1706 may include switches, filters, amplifiers, etc. to facilitate the communication with the wireless network. RF circuitry 1706 may include a receive signal path which may include circuitry to down-convert RF signals received from the FEM circuitry 1708 and provide baseband signals to the baseband circuitry 1704. RF circuitry 1706 may also include a transmit signal path which may include circuitry to up-convert baseband signals provided by the baseband circuitry 1704 and provide RF output signals to the FEM circuitry 1708 for transmission.

In some embodiments, the RF circuitry 1706 may include a receive signal path and a transmit signal path. The receive signal path of the RF circuitry 1706 may include mixer circuitry 1706a, amplifier circuitry 1706b and filter circuitry 1706c. The transmit signal path of the RF circuitry 1706 may include filter circuitry 1706 c and mixer circuitry 1706a. RF circuitry 1706 may also include synthesizer circuitry 1706d for synthesizing a frequency for use by the mixer circuitry 1706a of the receive signal path and the transmit signal path. In some embodiments, the mixer circuitry 1706a of the receive signal path may be configured to down-convert RF signals received from the FEM circuitry 1708 based on the synthesized frequency provided by synthesizer circuitry 1706d. The amplifier circuitry 1706b may be configured to amplify the down-converted signals and the filter circuitry 1706c may be a low-pass filter (LPF) or band-pass filter (BPF) configured to remove unwanted signals from the down-converted signals to generate output baseband signals. Output baseband signals may be provided to the baseband circuitry 1704 for further processing. In some embodiments, the output baseband signals may be zero-frequency baseband signals, although this is not a requirement. In some embodiments, mixer circuitry 1706a of the receive signal path may comprise passive mixers, although the scope of the embodiments is not limited in this respect.

In some embodiments, the mixer circuitry 1706a of the transmit signal path may be configured to up-convert input baseband signals based on the synthesized frequency provided by the synthesizer circuitry 1706d to generate RF output signals for the FEM circuitry 1708. The baseband signals may be provided by the baseband circuitry 1704 and may be filtered by filter circuitry 1706c. The filter circuitry 1706c may include a low-pass filter (LPF), although the scope of the embodiments is not limited in this respect.

In some embodiments, the mixer circuitry 1706a of the receive signal path and the mixer circuitry 1706a of the transmit signal path may include two or more mixers and may be arranged for quadrature downconversion and/or upconversion respectively. In some embodiments, the mixer circuitry 1706a of the receive signal path and the mixer circuitry 1706a of the transmit signal path may include two or more mixers and may be arranged for image rejection (e.g., Hartley image rejection). In some embodiments, the mixer circuitry 1706a of the receive signal path and the mixer circuitry 1706a may be arranged for direct downconversion and/or direct upconversion, respectively. In some embodiments, the mixer circuitry 1706a of the receive signal path and the mixer circuitry 1706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1706 may include analog-to-digital converter (ADC) and digital-to-analog converter (DAC) circuitry and the baseband circuitry 1704 may include a digital baseband interface to communicate with the RF circuitry 1706.

In some dual-mode embodiments, a separate radio IC circuitry may be provided for processing signals for each spectrum, although the scope of the embodiments is not limited in this respect.

In some embodiments, the synthesizer circuitry 1706d may be a fractional-N synthesizer or a fractional N/N+1 synthesizer, although the scope of the embodiments is not limited in this respect as other types of frequency synthesizers may be suitable. For example, synthesizer circuitry 1706d may be a delta-sigma synthesizer, a frequency multiplier, or a synthesizer comprising a phase-locked loop with a frequency divider.

The synthesizer circuitry 1706d may be configured to synthesize an output frequency for use by the mixer circuitry 1706a of the RF circuitry 1706 based on a frequency input and a divider control input. In some embodiments, the synthesizer circuitry 1706d may be a fractional N/N+1 synthesizer.

In some embodiments, frequency input may be provided by a voltage controlled oscillator (VCO), although that is not a requirement. Divider control input may be provided by either the baseband circuitry 1704 or the applications processor 1702 depending on the desired output frequency. In some embodiments, a divider control input (e.g., N) may be determined from a look-up table based on a channel indicated by the applications processor 1702.

Synthesizer circuitry 1706d of the RF circuitry 1706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1706 may include an IQ/polar converter.

FEM circuitry 1708 may include a receive signal path which may include circuitry configured to operate on RF signals received from one or more antennas 1710, amplify the received signals and provide the amplified versions of the received signals to the RF circuitry 1706 for further processing. FEM circuitry 1708 may also include a transmit signal path which may include circuitry configured to amplify signals for transmission provided by the RF circuitry 1706 for transmission by one or more of the one or more antennas 1710. When used in a mobile device, FEM circuitry 1708 may also include a transmit and receive path for device-to-device communications received directly from another mobile device, without traveling through the E-UTRAN (e.g. Device-to-device interface circuitry). When used in a mobile device, FEM circuitry 1708 may also include a transmit and receive path for cellular communications received from the eNB or E-UTRAN (e.g. cellular interface circuitry).

In some embodiments, the FEM circuitry 1708 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1706). The transmit signal path of the FEM circuitry 1708 may include a power amplifier (PA) to amplify input RF signals (e.g., provided by RF circuitry 1706), and one or more filters to generate RF signals for subsequent transmission (e.g., by one or more of the one or more antennas 1710.

In some embodiments, the device 1700 may include additional elements such as, for example, memory/storage, display, camera, sensor, and/or input/output (I/O) interface.

While the systems, circuitry and methods have been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a mobile device, including coordinator circuitry. The coordinator circuitry is configured to: select a plurality of mobile devices as belonging to a group with the mobile device; generate joint transmission information describing transmission information for use by the plurality of mobile devices in transmitting data related to a cooperative communication message to a destination node; and instruct the mobile device to transmit a coordination message to the plurality of mobile devices, wherein the coordination message includes the joint transmission information.

Example 2 includes the subject matter of example 1, including or omitting optional elements, wherein the cooperative communication message comprises respective data that is sent by a respective each of the plurality of mobile devices to the destination node to indicate a single message from a single source.

Example 3 includes the subject matter of example 1, including or omitting optional elements, wherein the coordinator circuitry is configured to generate joint transmission information that specifies a radio access technology (RAT) used by the plurality of mobile devices to transmit the data.

Example 4 includes the subject matter of example 1, including or omitting optional elements, wherein the coordinator circuitry is configured to generate joint transmission information that specifies a communication resource used by the plurality of mobile devices to transmit the data.

Example 5 includes the subject matter of example 1, including or omitting optional elements, wherein the coordinator circuitry is configured to generate joint transmission information that specifies transmitter parameters used by the plurality of mobile devices to transmit the data.

Example 6 includes the subject matter of examples 1-5, including or omitting optional elements, wherein the coordinator circuitry is configured to transmit a control frame that instructs the plurality of mobile devices to transmit the data.

Example 7 includes the subject matter of examples 1-5, including or omitting optional elements, wherein the coordinator circuitry is configured to generate joint transmission information that specifies a transmission time at which the plurality of mobile devices transmit the data.

Example 8 includes the subject matter of examples 1-5, including or omitting optional elements, wherein the coordinator circuitry is configured to: determine channel information describing respective channels between the plurality of mobile devices and the destination node; determine beamforming weights for the plurality of mobile devices based on the channel information; and generate joint transmission information for each of the mobile devices that describes the beamforming weights for the respective mobile device.

Example 6 includes the subject matter of example 8, including or omitting optional elements, wherein the coordinator circuitry is configured to request the channel information from a second device.

Example 10 includes the subject matter of examples 1-5, including or omitting optional elements, wherein the cooperative communication message comprises a set of data, and further wherein the coordinator circuitry is configured to generate joint transmission information that specifies a respective portion of the set of data transmitted by each of the respective plurality of mobile devices, wherein each portion comprises a subset of the set data that is less than an entirety of the set of data.

Example 11 is a method for coordinating communication amongst a plurality of mobile devices, including: generating joint transmission information describing transmission information for use by the plurality of mobile devices in transmitting data related to a cooperative communication message to a destination node; and instructing a mobile device to transmit a coordination message to the plurality of mobile devices, wherein the coordination message includes the joint transmission information.

Example 12 includes the subject matter of example 11, including or omitting optional elements, including transmitting a control frame that instructs the plurality of mobile devices to transmit the data.

Example 13 includes the subject matter of example 11, including or omitting optional elements, including generating joint transmission information that specifies a transmission time at which the plurality of mobile devices transmit the data.

Example 14 includes the subject matter of examples 11-13, including or omitting optional elements, including determining channel information describing respective channels between the plurality of mobile devices and the destination node; determining beamforming weights for the plurality of mobile devices based on the channel information; and generating joint transmission information for each of the mobile devices that describes the beamforming weights for the respective mobile device.

Example 14 includes the subject matter of examples 11-13, including or omitting optional elements, wherein the cooperative communication message comprises a set of data, and including generating joint transmission information that specifies a respective portion of the set of data transmitted by each of the respective plurality of mobile devices, wherein each portion comprises a subset of the set data that is less than an entirety of the set of data.

Example 17 is a computer-readable storage device storing computer-executable instructions that, in response to execution, cause a processor to: identify a coordination message comprising joint transmission information for a cooperative communication message; select data related to the cooperative communication message; and instruct a mobile device to transmit the data to a destination node based at least on the joint transmission message.

Example 18 includes the subject matter of example 17, including or omitting optional elements, including computer-executable instructions that, in response to execution, cause the processor to: analyze the coordination message to determine that the cooperative communication message is a beamformed cooperative communication message; and instruct the mobile device to transmit the data based at least on beamforming weights included in coordination message.

Example 19 includes the subject matter of example 17, including or omitting optional elements, including computer-executable instructions that, in response to execution, cause the processor to: analyze the coordination message to determine a subset of data corresponding to the cooperative communication message, wherein the subset of data is less than an entirety of a set of data corresponding to the cooperative communication message; and determine the subset of data as the data.

Example 20 includes the subject matter of examples 17-19, including or omitting optional elements, including computer-executable instructions that, in response to execution, cause the processor to instruct the mobile device to transmit the data in response to receiving a trigger frame from another mobile device.

Example 21 includes the subject matter of examples 17-19, including or omitting optional elements, including computer-executable instructions that, in response to execution, cause the processor to: analyze the coordination message to determine a transmission time for the cooperative communication message; and instruct the mobile device to transmit the data when the transmission time is reached.

Example 22 is a method for performing network coded transmissions, including: identifying a first message received from a first mobile device; identifying a second message received from a second mobile device; combining the first message and the second message, based at least on network coding information, to generate a third message; and instructing a third mobile device to transmit the third message to the first mobile device and the second mobile device.

Example 23 includes the subject matter of example 22, including or omitting optional elements wherein the third message comprises all data corresponding to the first message and all data corresponding to the second message.

Example 24 is an apparatus for coordinating communication amongst a plurality of mobile devices, including: means for generating joint transmission information describing transmission information for use by the plurality of mobile devices in transmitting data related to a cooperative communication message to a destination node; and means for instructing a mobile device to transmit a coordination message to the plurality of mobile devices, wherein the coordination message includes the joint transmission information.

Example 25 includes the subject matter of example 24, including or omitting optional elements, including means for transmitting a control frame that instructs the plurality of mobile devices to transmit the data.

Example 26 is a method, including: identifying a coordination message comprising joint transmission information for a cooperative communication message; selecting data related to the cooperative communication message; and instructing a mobile device to transmit the data to a destination node based at least on the joint transmission message.

Example 27 includes the subject matter of example 26, including or omitting optional elements, including analyzing the coordination message to determine that the cooperative communication message is a beamformed cooperative communication message; and instructing the mobile device to transmit the data based at least on beamforming weights included in coordination message.

Example 28 includes the subject matter of example 26, including or omitting optional elements, including analyzing the coordination message to determine a subset of data corresponding to the cooperative communication message, wherein the subset of data is less than an entirety of a set of data corresponding to the cooperative communication message; and determining the subset of data as the data.

Example 29 includes the subject matter of examples 26-28, including or omitting optional elements, including transmitting the data in response to receiving a trigger frame from another mobile device.

Example 30 includes the subject matter of examples 26-28, including or omitting optional elements, including analyzing the coordination message to determine a transmission time for the cooperative communication message; and instructing the mobile device to transmit the data when the transmission time is reached.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

The invention claimed is:

1. A mobile device, comprising:
coordinator circuitry configured to:
select a plurality of mobile devices as belonging to a group with the mobile device;
generate joint transmission information to be used by the plurality of mobile devices in coordination of transmissions of data related to a cooperative communication message to a destination node; and
instruct the mobile device to transmit a coordination message to the plurality of mobile devices, wherein the coordination message includes the joint transmission information.

2. The mobile device of claim 1, wherein the cooperative communication message comprises respective data that is sent by a respective each of the plurality of mobile devices to the destination node such that the destination node interprets the data sent by the plurality of mobile devices as corresponding to a single message from a single source.

3. The mobile device of claim 1, wherein the coordinator circuitry is configured to generate joint transmission information that specifies a radio access technology (RAT) used by the plurality of mobile devices to transmit the data.

4. The mobile device of claim 1, wherein the coordinator circuitry is configured to generate joint transmission information that specifies a communication resource used by the plurality of mobile devices to transmit the data.

5. The mobile device of claim 1, wherein the coordinator circuitry is configured to generate joint transmission information that specifies transmitter parameters used by the plurality of mobile devices to transmit the data.

6. The mobile device of claim 1, wherein the coordinator circuitry is configured to transmit a control frame that instructs the plurality of mobile devices to transmit the data.

7. The mobile device of claim 1, wherein the coordinator circuitry is configured to generate joint transmission information that specifies a transmission time at which the plurality of mobile devices transmit the data.

8. The mobile device of claim 1, wherein the coordinator circuitry is configured to:
determine channel information describing respective channels between the plurality of mobile devices and the destination node;
determine beamforming weights for the plurality of mobile devices based on the channel information; and
generate joint transmission information for each of the mobile devices that describes beamforming weights for the respective mobile device.

9. The mobile device of claim 8, wherein the coordinator circuitry is configured to request the channel information from a second mobile device.

10. The mobile device of claim 1, wherein the cooperative communication message comprises a set of data, and further wherein the coordinator circuitry is configured to generate joint transmission information that specifies a respective portion of the set of data transmitted by each of the respective plurality of mobile devices, wherein each portion comprises a subset of the set data that is less than an entirety of the set of data.

11. A method for coordinating communication amongst a plurality of mobile devices belonging to a group with a first mobile device, comprising:
generating joint transmission information describing transmission information to be used by the plurality of mobile devices in coordination of transmissions of data related to a cooperative communication message to a destination node; and
instructing the first mobile device to transmit a coordination message to the plurality of mobile devices, wherein the coordination message includes the joint transmission information.

12. The method of claim 11, comprising transmitting a control frame that instructs the plurality of mobile devices to transmit the data.

13. The method of claim 11, comprising generating joint transmission information that specifies a transmission time at which the plurality of mobile devices transmit the data.

14. The method of claim 11, comprising:
determining channel information describing respective channels between the plurality of mobile devices and the destination node;
determining beamforming weights for the plurality of mobile devices based on the channel information; and
generating joint transmission information for each of the mobile devices that describes beamforming weights for the respective mobile device.

15. The method of claim 11, wherein the cooperative communication message comprises a set of data, and wherein the method comprises generating joint transmission information that specifies a respective portion of the set of data transmitted by each of the respective plurality of mobile devices, wherein each portion comprises a subset of the set data that is less than an entirety of the set of data.

16. A computer-readable storage device storing computer-executable instructions that, in response to execution, cause a processor to:
identify a coordination message comprising joint transmission information to be used by a plurality of mobile devices belonging to a group with a first mobile device in coordination of transmissions of data related to a cooperative communication message to a destination node;
select data related to the cooperative communication message; and
instruct the first mobile device to transmit the data to the destination node based at least on the joint transmission message.

17. The computer-readable storage device of claim 16, further storing computer-executable instructions that, in response to execution, cause the processor to:
analyze the coordination message to determine that the cooperative communication message is a beamformed cooperative communication message; and
instruct the mobile device to transmit the data based at least on beamforming weights included in coordination message.

18. The computer-readable storage device of claim 16, further storing computer-executable instructions that, in response to execution, cause the processor to:
analyze the coordination message to determine a subset of data corresponding to the cooperative communication message, wherein the subset of data is less than an entirety of a set of data corresponding to the cooperative communication message; and
determine the subset of data as the data.

19. The computer-readable storage device of claim 16, further storing computer-executable instructions that, in response to execution, cause the processor to instruct the mobile device to transmit the data in response to receiving a trigger frame from another mobile device.

20. The computer-readable storage device of claim 16, further storing computer-executable instructions that, in response to execution, cause the processor to:

analyze the coordination message to determine a transmission time for the cooperative communication message; and instruct the mobile device to transmit the data when the transmission time is reached.

21. A method for performing network coded transmissions, comprising:

identifying a first message received from a first mobile device;

identifying a second message received from a second mobile device;

combining the first message and the second message, based at least on network coding information, to generate a third message; and instructing a third mobile device to transmit the third message to the first mobile device and the second mobile device.

22. The method of claim 21, wherein the third message comprises all data corresponding to the first message and all data corresponding to the second message.

* * * * *

UNITED STATES PATENT AND TRADEMARK OFFICE
CERTIFICATE OF CORRECTION

| | | |
|---|---|---|
| PATENT NO. | : 11,089,444 B2 | Page 1 of 1 |
| APPLICATION NO. | : 16/473430 | |
| DATED | : August 10, 2021 | |
| INVENTOR(S) | : Dave Cavalcanti et al. | |

It is certified that error appears in the above-identified patent and that said Letters Patent is hereby corrected as shown below:

In the Claims

In the list of inventors (item (72)), the name of the inventor "Ranganadh Karelia" should read --Ranganadh Karella--.

Signed and Sealed this
Sixth Day of September, 2022

Katherine Kelly Vidal
Director of the United States Patent and Trademark Office